United States Patent
Nakanishi et al.

(10) Patent No.: US 6,953,290 B2
(45) Date of Patent: Oct. 11, 2005

(54) SLEEVE ASSEMBLY AND OPTICAL SUB-ASSEMBLY USING THE SAME

(75) Inventors: Hiromi Nakanishi, Osaka (JP); Masaki Hurumai, Osaka (JP)

(73) Assignee: Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 10/887,300

(22) Filed: Jul. 9, 2004

(65) Prior Publication Data

US 2005/0036745 A1 Feb. 17, 2005

(30) Foreign Application Priority Data

Jul. 9, 2003 (JP) .................................. 2003-272412

(51) Int. Cl.[7] .................................................. G02B 6/36
(52) U.S. Cl. ........................................ 385/93; 385/88
(58) Field of Search ...................... 385/76–94; 359/642, 359/830

(56) References Cited

U.S. PATENT DOCUMENTS

| | | | |
|---|---|---|---|
| 6,272,272 B1 * | 8/2001 | Ford ........................... | 385/52 |
| 6,799,901 B2 * | 10/2004 | Yoshimura et al. ........... | 385/88 |
| 2001/0024551 A1 * | 9/2001 | Yonemura et al. ............ | 385/88 |
| 2002/0131122 A1 * | 9/2002 | Anderl et al. ................ | 359/152 |

FOREIGN PATENT DOCUMENTS

| | | |
|---|---|---|
| JP | 02-033115 | 2/1990 |
| JP | 09-033759 | 2/1997 |
| JP | 10-332988 | 12/1998 |

OTHER PUBLICATIONS

U.S. Appl. No. 10/866,073, filed Jun. 14, 2004.

* cited by examiner

Primary Examiner—Frank G. Font
Assistant Examiner—Erin Chiem
(74) Attorney, Agent, or Firm—McDermott Will & Emery LLP

(57) ABSTRACT

The present invention provides a sleeve assembly and an optical sub-assembly, in which dimensional tolerance may be expanded for both holding the stub and inserting/extracting the ferrule. The sleeve assembly of the present invention includes a stub, a bush, a sleeve, a ring member, and a sleeve cover. The stub is held by the bush such that the bush is press-fitted between the first portion of the stub and the sleeve cover. While, the second portion of the stub is secured by the ring member through the first mating portion of the sleeve. Thus, in the present sleeve assembly, dimensional accuracy for holding the stub and that for inserting/extracting the ferrule are independent with respect to each other. Therefore, manufacturing tolerance of the sleeve assembly can be widened.

20 Claims, 8 Drawing Sheets

SLEEVE ASSEMBLY AND OPTICAL SUB-ASSEMBLY USING THE SAME

BACKGROUND OF THE INVENTION

1. Filed of the Invention

The present invention relates to a sleeve assembly and optical sub-assemblies using the sleeve assembly.

2. Related Prior Art

FIG. 8 shows a conventional sleeve assembly 100, which comprises a stub 102, a split sleeve 104, a bush 106 and the sleeve cover 108. The stub 102 is a tubular member extending along the optical axis, and secures a coupling fiber 102a in a center thereof The split sleeve 104 is also a tubular member extending along the optical axis and provides a slit. The sleeve 104 holds the stub 102 in one end thereof, receives an optical ferrule 110 inserted from the other end, thus, optically couples the coupling fiber 102a in the stub 102 with an optical fiber 110a secured in the ferrule 110. The end of the sleeve 104 provides the bush 106 with the stub 102, i.e., the bush 106 is press-fitted between the split sleeve 104 and the sleeve cover 108. The sleeve cover 108 is also a tubular member extending along the optical axis, and holds the bush 106 therein.

An object for using such split sleeve in a sleeve assembly is to enhance performance of the ferrule inserting into/extracting from the sleeve and ability for holding the stub by utilizing elasticity to a circumferential direction of the split sleeve. In the conventional sleeve assembly described above, the sleeve is held by press-fitting the bush between the sleeve cover and the stub. Thus, to cope with both the stub holding and the ferrule inserting/extracting performance, dimensional accuracy both of the sleeve and the bush are required, which restricts manufacturing tolerance of the sleeve assembly.

Therefore, one object of the present invention is to provide a sleeve assembly that has large manufacturing tolerance for the dimensional accuracy of the stub, the sleeve, and the bush.

SUMMARY OF THE INVENTION

One aspect of the present invention relates to a sleeve assembly that comprises a stub, a sleeve, a ring member, a bush and a sleeve cover. The stub has first and second portions. The sleeve has first and second mating portions. The first mating portion of the sleeve mates with the second portion of the stub, while the second mating portion of the sleeve receives a ferrule, in which a transmission optical fiber is held. The ring member surrounds and holds the first mating portion of the sleeve. The bush may be press-fitted between the stub and the sleeve cover. Thus, the sleeve cover protects the bush, the ring member, and the sleeve. The sleeve may be a split sleeve having a slit along the axis thereof and made of ceramic or metal. The stub may be made of ceramic. The bush and the ring member may be made of metal.

The sleeve cover of the present invention may include first and second bores both having respective diameters. The diameter of the first bore may be greater than that of the second bore, accordingly, the first bore receives the bush and the ring member therein, while the second bore receives the sleeve.

In a modified sleeve assembly of the present invention, the bush may include first and second bores both having respective diameters. The diameter of the second bore of the bush is greater than that of the first bore of the bush, accordingly, the second bore of the bush may receives the first portion of the sleeve through the ring member, while the first bore of the bush may receive the stub.

Another aspect of the present invention relates to an optical sub-assembly that includes an optical device, a sleeve assembly, and an alignment member disposed between the optical device and the sleeve assembly for optically aligning therebetween. The optical device may include a semiconductor optical device, such as a laser diode for the transmitting optical sub-assembly or a photodiode for the receiving optical sub-assembly, a stem, a plurality of leads and a cap. The stem mounts the semiconductor optical device thereon, and secures the plurality of leads thereto. The cap, which is provided on the stem, forms a cavity co-operating with the stem, and the semiconductor optical device is enclosed within the cavity. The sleeve assembly may include a stub, a sleeve, a bush, a ring member, and a sleeve cover. The stub has first and second portions. The sleeve has first and second mating portions. The first mating portion of the sleeve receives the stub, while the second mating portion of the sleeve receives a ferrule. The bush holds the first portion of the stub, i.e.; the bush may be press-fitted between the stub and the sleeve cover, while the ring member holds the first mating portion of the sleeve. The sleeve cover protects the bush, the ring member, and the sleeve.

In the optical sub-assembly according to the present invention, the sleeve cover may comprise first and second bore both having respective diameters, The diameter of the second bore of the sleeve cover is smaller than that of the first bore of the sleeve cover. Accordingly, the first bore of the sleeve cover receives the bush, while the second bore of the sleeve cover receives the ring member.

The bush may include first and second bore both having respective diameters. The diameter of the second bore of the bush is greater than that of the first bore of the bush, thus, the first bore of the bush may receive the stub and the second bore of the bush may receive the first mating portion of the sleeve through the ring member.

DETAILED DESCRIPTION OF PREFERRED EMBODIMENTS

Next, preferred embodiments of the present invention will be described as referring to accompanying drawings. In the specification and drawings, same elements will be referred by the same numerals and symbols without overlapping explanations.

First Embodiment

Figure 1:
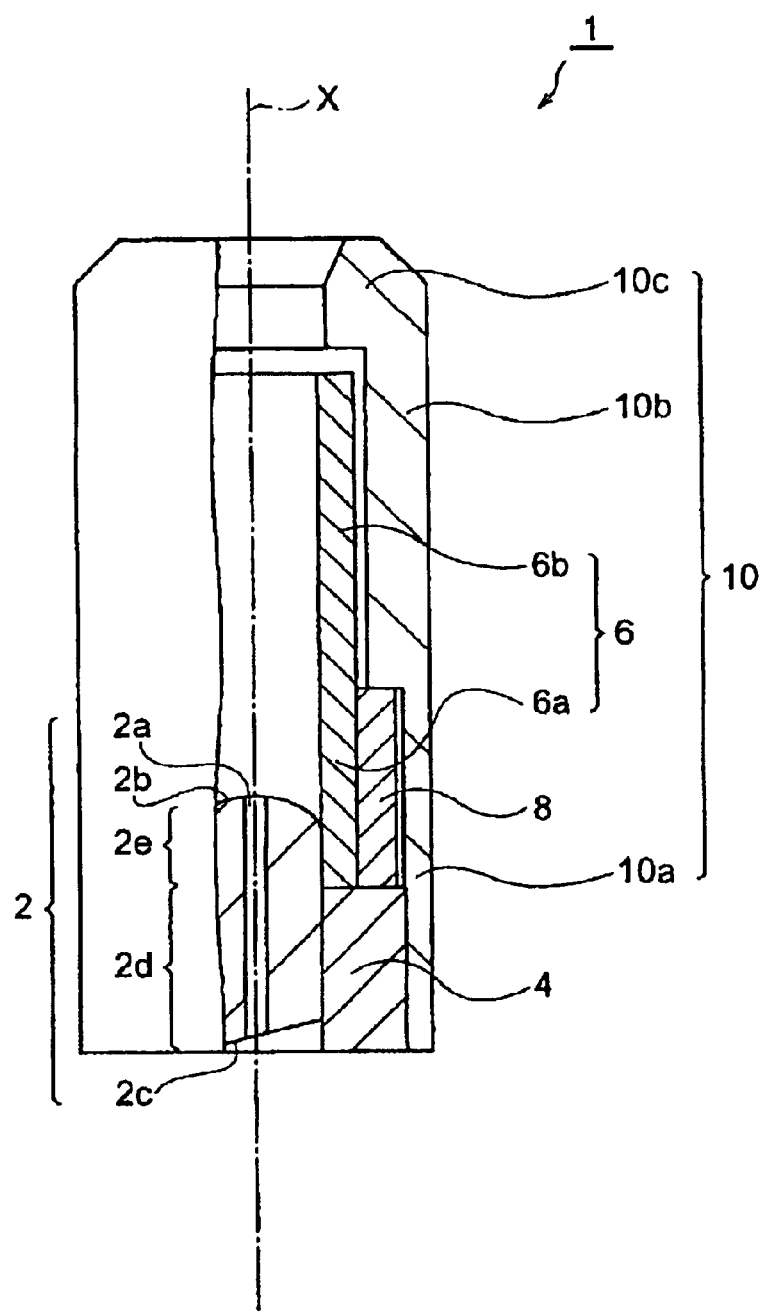
FIG. 1 is a cutaway perspective view showing the sleeve assembly according to the first embodiment of the present invention.

FIG. 1 is a cutaway side view of a sleeve assembly 1 according to the first embodiment of the present invention. The sleeve assembly 1 includes a stub 2, a bush 4, a sleeve 6, a ring member 8, and a sleeve cover 10. The stub 2 is a tubular member extending along a direction X and provides a bore for securing a coupling fiber 2a therein. The stub 2 is made of ceramic such as zirconia.

One end of the stub 2b is spherically formed with a radius of 20 mm, for example. The other end 2c thereof has a plane inclined to the direction X in order to reduce light reflected thereby back to the direction X. In the case that the end surface 2c is not inclined, i.e., perpendicular to the direction X, the reflection of the light back to the direction X may be reduced by coating the surface 2c with an anti-reflection film.

The stub 2 comprises, along the direction X, a first portion 2d and a second portion 2e. In the present embodiment, the total length of the stub is about 3 mm, and that of each portions are about 1.5 mm, respectively. The first portion 2d is press-fitted into a bore of the bush 4. The bush 4 is also a tubular member extending along the direction X, and made of metal such as SUS 303 and SF20T The second portion 2e of the stub 2 is mated with the sleeve 6.

Figure 2:
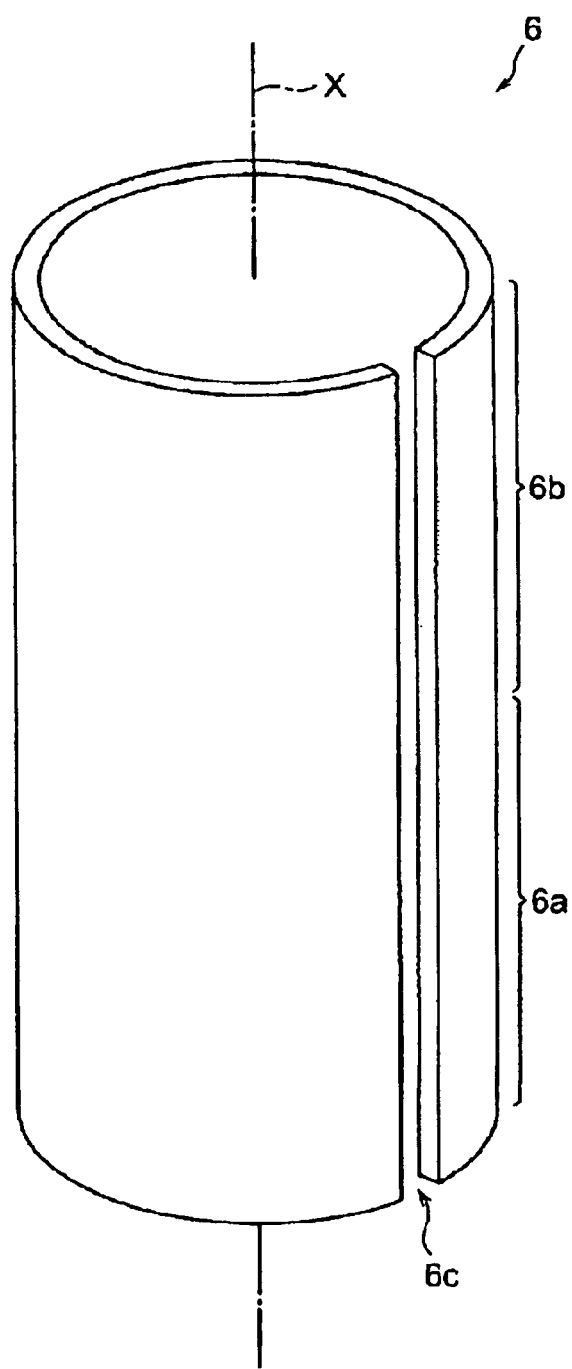
FIG. 2 is a perspective view of the sleeve used in the present invention.

FIG. 2 is a perspective view showing the sleeve 6. The sleeve 6, also tubular member and extending along the direction X, comprises a first mating portion 6a into which the stub is inserted and a second mating portion 6b into which a ferrule is inserted. The sleeve 6 of the present embodiment may be a split sleeve having a slit along the axis, thereby having elasticity in the diameter direction. The outer diameter of the stub 2 is 1.249 mm+/−0.0005, while the inner diameter of the first portion of the bush is 1.2485 mm+/−0.0005 in the present embodiment.

The second mating portion 6b of the sleeve 6 receives the ferrule (not shown in figures) inserted into the opening of the bore. The ferrule secures an optical fiber in a center thereof. Inserting the ferrule into the second mating portion 6b of the sleeve 6, the optical fiber secured in the ferrule may optically couples to the coupling fiber 2a provided in the center of the stub 2.

The sleeve may be also made of ceramic such as zirocnia, whereby dimensional accuracy thereof can be enhanced and inserting/extracting performance of the ferrule can be improved. The sleeve 6, in addition to ceramics, may be made of metal such as phosphor bronze.

The first mating portion 6a of the sleeve is inserted into the bore of the ring member 8. The ring member 8 is also a tubular member extending along the direction X. The second mating portion 6a of the sleeve 6, mated with the second portion 2e of the stub, is inserted into the bore of the ring member 8, whereby the sleeve 6 is prevented from wiggling. The ring member 8 may be made of metal such as SUS 303 and SF20T, and have the inner diameter of 1.625 mm with an accuracy of −0.005/+0.0 mm.

The sleeve cover 10 is also a tubular member along the direction X to cover the stub 2, the bush 4, the sleeve 6, and the ring member 8. The sleeve cover 10 of the present embodiment includes a first portion 10a having a larger bore, a second portion 10b having a smaller bore, and an opening 10c. The first portion 10a has an inner diameter larger than that of the second portion 10b. The bush 4 is inserted into the first portion 10a of the sleeve cover 10. The sleeve cover 10, made of metal such as SUS 303, is tapered in the open edge 10c thereof to facilitate the ferrule being inserted therein. The sleeve cover 10 may be made of epoxy resin.

In thus configured sleeve assembly 1, the bush 4 holds the stub 2 by press-fitting therein, and the ring member 8 holds the sleeve 6 by press-fitting the first mating portion 6a thereof that receives and mates with the second portion 2e of the stub 2. The holding force of the stub 2 by the bush 4 depends on the dimensional accuracy of the bush 4 and the stub 2, and the performance of the ferrule inserting into/extracting from the sleeve 6 depends on the dimensional accuracy of the stub 2, the sleeve 6, and the ring member 8. Therefore, in the present configuration, the accuracy for enhancing the holding force of the stub 2 and that for the ferrule inserting into/extracting from the sleeve 6 can be independent with respect to each other, which makes it easy to form the sleeve assembly 1.

Figure 3:
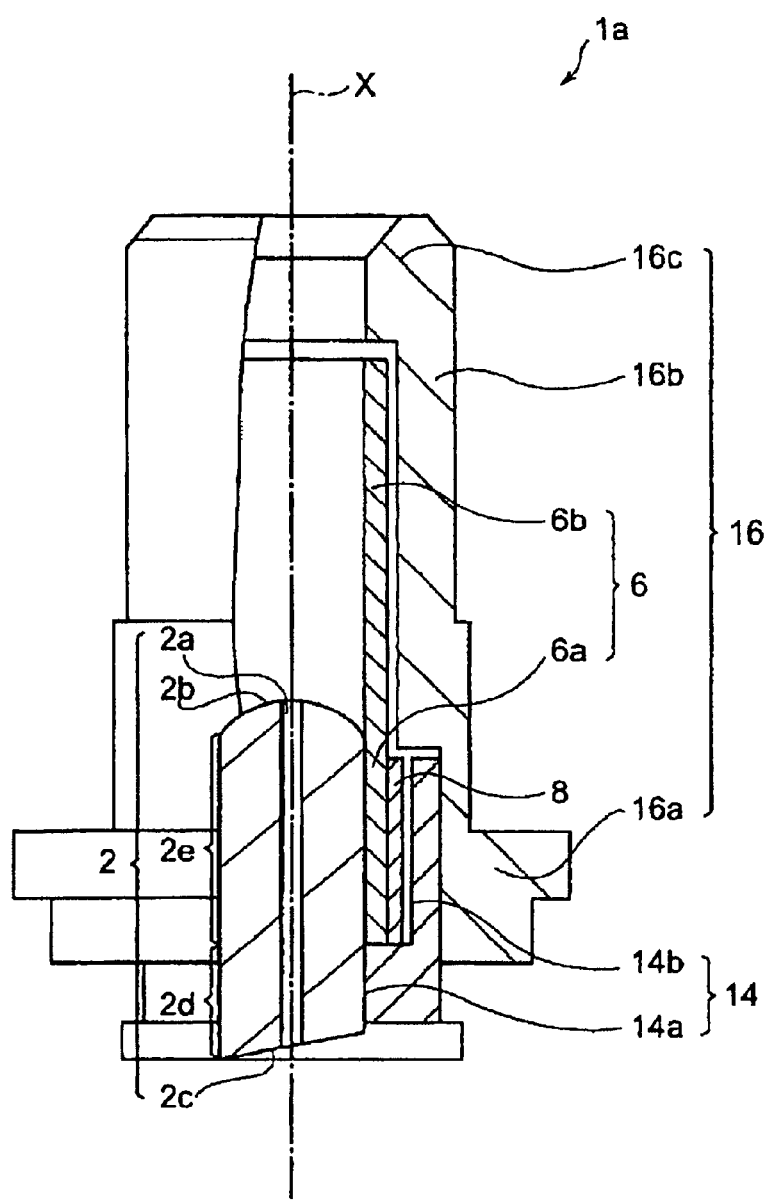
FIG. 3 is a cutaway perspective view showing the sleeve assembly according to the second embodiment of the present invention.

On the other hand in the conventional sleeve assembly 100 previously described, the ceramic sleeve 104 fully covers and holds the stub 102, which requires that the sleeve 100 and the stub 102 are formed in high accuracy. The sleeve assembly 1 of the present invention holds the stub 2 by the metal bush 4, which allows the wide dimensional tolerance thereof Second Embodiment Next, a modified sleeve assembly 1a according to the second embodiment of the present invention will be described. FIG. 3 is a cutaway side view of the modified sleeve assembly 1a. The sleeve assembly 1a comprises, similar to the first embodiment, a stub 2, a bush 14, a sleeve 6, a ring member 8, and a sleeve cover 16. The stub 2, the sleeve 6, the ring member 8 are identical with those used in the sleeve assembly 1 of the first embodiment.

The bush 14 of the present invention is a tubular member extending along the direction X. The bush 14 provides a first bore 14a and a second bore 14b, both disposed along the direction X and a diameter of the latter bore 14b is greater than that of the former bore 14a. The first bore 14a fits the first portion of the stub 2, while the second bore 14b receives the ring member 8 and the first mating portion 6a that mates with the second portion 2e of the stub 2 therein. The bush may by made of SUS 303 and SF20T.

The sleeve cover 16 provides a first portion 16a, a second portion 16b, and an opening. The inner diameter of the first portion is larger than that of the second portion, and inserts the bush 14 therein. The opening 16c is also tapered in the edge thereof. The sleeve cover 16 may be made of SUS 303 or epoxy resin.

In the sleeve assembly 1a of the second embodiment, similar to the sleeve assembly 1 of the first embodiment, the holding force for the stub 2 depends on the dimensional accuracy of the bush 14 and the stub 2, while the performance of the ferrule inserting into/extracting from the sleeve 6 depends on the dimensional accuracy of the stub 2, the sleeve 6 and ring member 8. Therefore, the accuracy for enhancing the holding force of the stub 2 and that for the ferrule inserting into/extracting from the sleeve 6 can be independent with respect to each other, which makes it easy to manufacture the sleeve assembly 1a. Moreover, since the metal bush 14 holds the stub 2, the dimensional accuracy for the stub 2 may be expanded.

Third Embodiment

Figure 4:
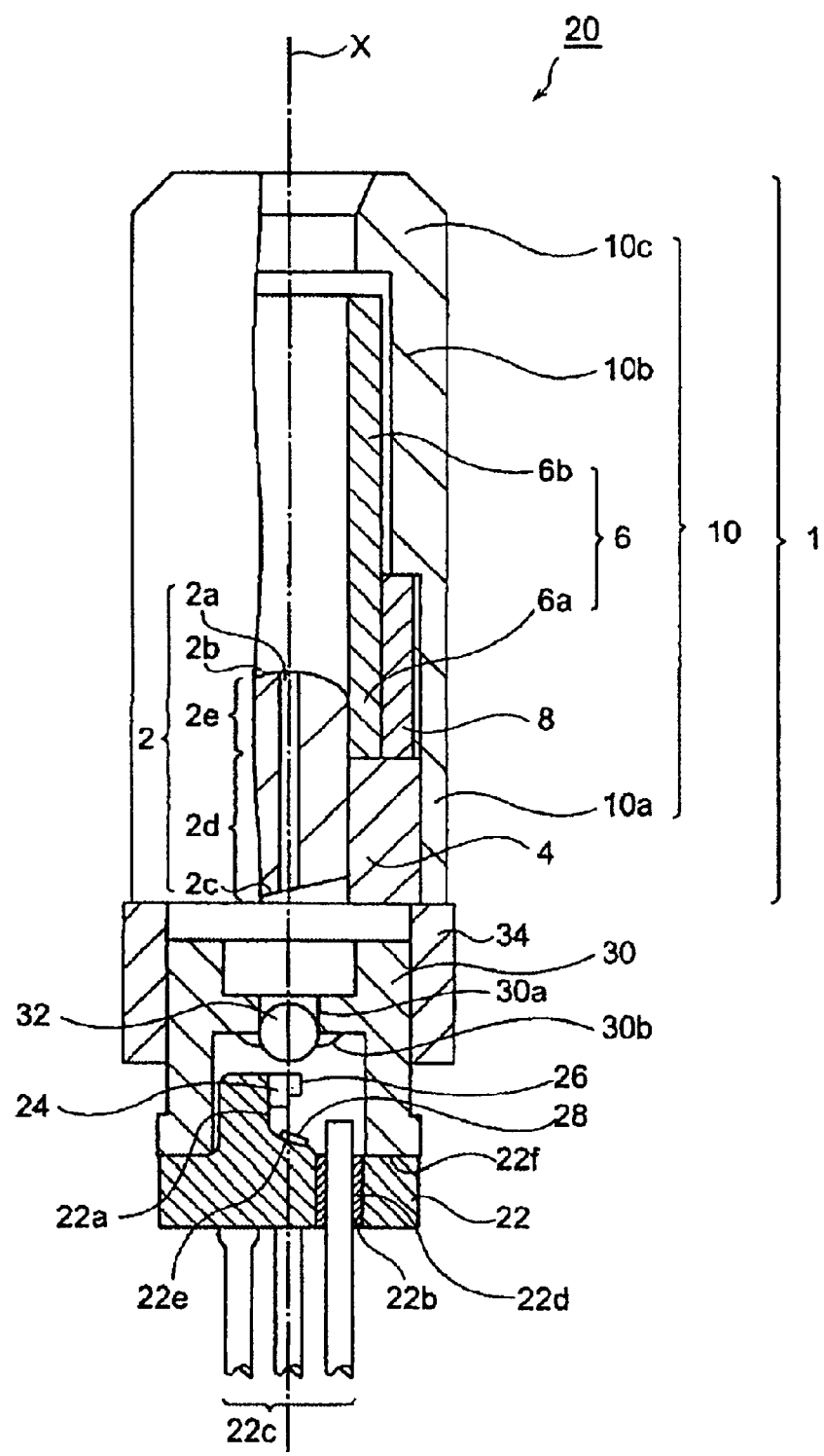
FIG. 4 shows a transmitting optical sub-assembly using the sleeve assembly of the first embodiment of the present invention.

Next, a transmitting optical sub-assembly (TOSA) 20 using the sleeve assembly 1 shown in FIG. 1 will be described. FIG. 4 is a cutaway side view showing the TOSA 20. The TOSA 20 includes a stem 22, a heat sink 24, a semiconductor light-emitting device 26, a semiconductor light-receiving device 28, a cap 30, a lens 32, an alignment member 34, and a sleeve assembly 1.

The stem 22 mounts the semiconductor light-emitting device thereon, i.e., the stem 22 includes a block 22a projecting therefrom along the direction X and the light-emitting device 26 is mounted on the side of the block 22a via the heat sink 24. The stem 22 and the heat sink 24 are made of metal such as stainless steel. In the present embodiment, the light-emitting device 26 is a semiconductor laser diode of an edge-emitting type that emits light toward the direction X. The light-emitting device 26 may be a laser diode of a distribution feedback (DFB) type.

The stem 22 provides a plurality of holes 22b extending along the direction X, through which leads 22c pass with a sealant 22d, such as a low-melting glass, filling the gap between the lead 22c and the hole 22b, thereby isolating the lead 22c from stem 22. One of lead 22c is electrically connected to the electrode of the light-emitting device 22c.

The stem 22 further provides a light-receiving device 28 on a surface 22e slant to the direction X. The light-receiving device 28, typically a semiconductor photodiode, receives light emitted from the rear facet of the light-emitting device 26, and outputs a current corresponding to the received light to the lead 22c. The surface 22e mounting the light-receiving device 28 thereon is slant to the direction X, accordingly, the light reflected by the surface of the light-receiving device 28 is prevented from returning to the light-emitting device 26. The stem 22 also includes a primary surface 22f, where the cap 30 made of metal such as a stainless steel is fixed thereto with the resistance welding.

The cap 30 is a tubular member and forms a cavity co-operating with the stem 22, where the light-emitting device 26 is enclosed therein. The cap 30 may provide a portion for holding a lens 32, which intersects the direction X and has an opening in the center thereof. The lens 32, secured in the lens-holding portion 30a with the low-melting glass 30b, converges the light emitted from the front facet of the light-emitting device 26 on the coupling fiber 2a provided in the stub 2.

On the outer peripheral surface of the cap 30 mates with an alignment member 34. One end surface of the alignment member 34 secures the sleeve assembly 1 thereon. The alignment member 34 optically aligns the sleeve assembly 1 with the light emitting device 26 by sliding the sleeve assembly 1 on the end surface of the alignment member 34, and sliding the alignment member 34 on the outer surface of the cap 30.

Since the present optical sub-assembly 20, the first mating portion 6a of the sleeve 6 fits the ring member 8, the sleeve is hard to wiggle due to an external force applied through the ferrule insertion. Accordingly, the optical coupling between the light-emitting device 26 with an optical fiber secured in the ferrule can be maintained.

Figure 5:
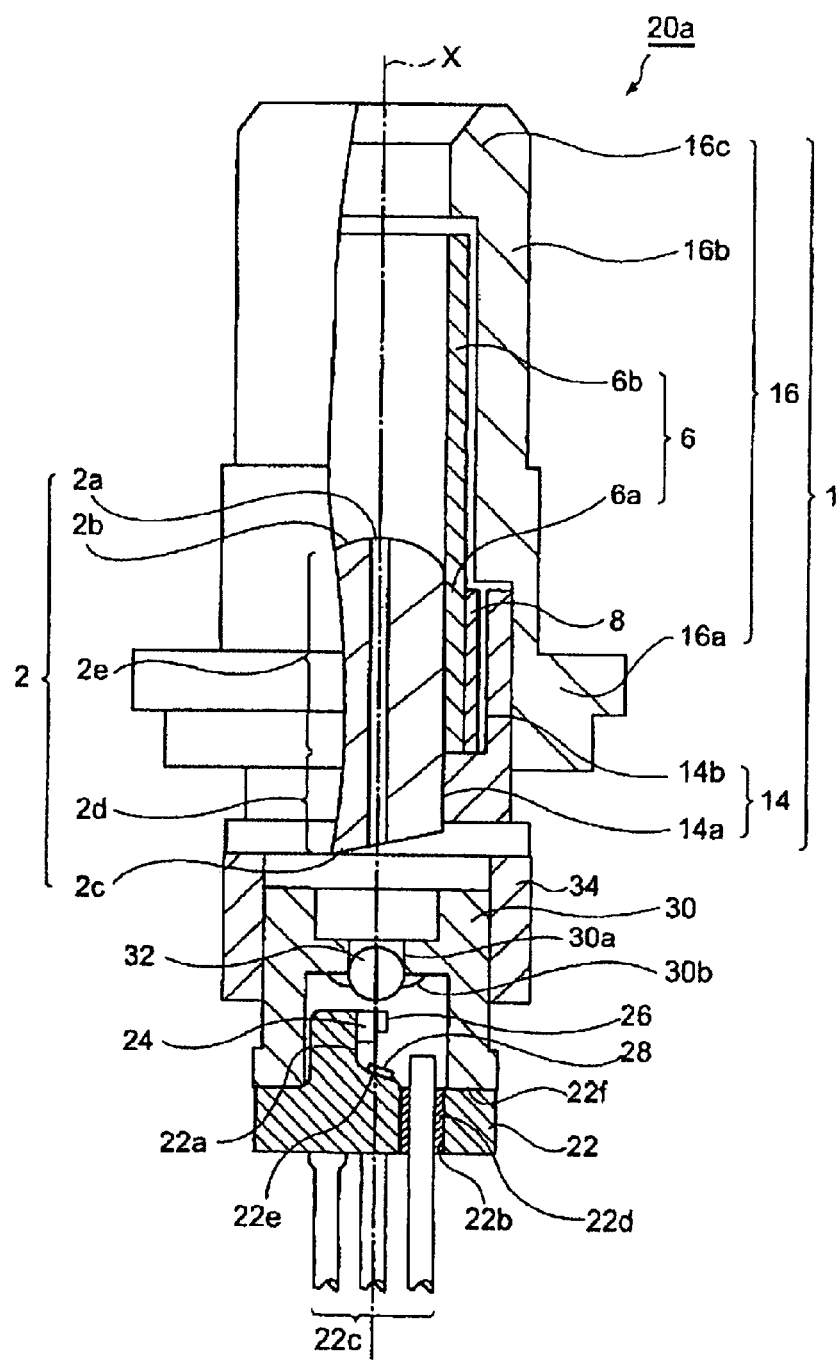
FIG. 5 shows another transmitting optical sub-assembly using the sleeve assembly of the second embodiment of the present invention.

Although in the present embodiment, the TOSA having a sleeve assembly 1 is disclosed, an alternative sub-assembly 20a that provides the sleeve assembly 1a shown in FIG. 3 may be applicable. FIG. 5 is a cutaway side view of the alternative sub-assembly 20a. Even the sleeve assembly 1a is applied, the optical sub-assembly realizing the sprit of the present invention can be obtained.

Fourth Embodiment

Figure 6:
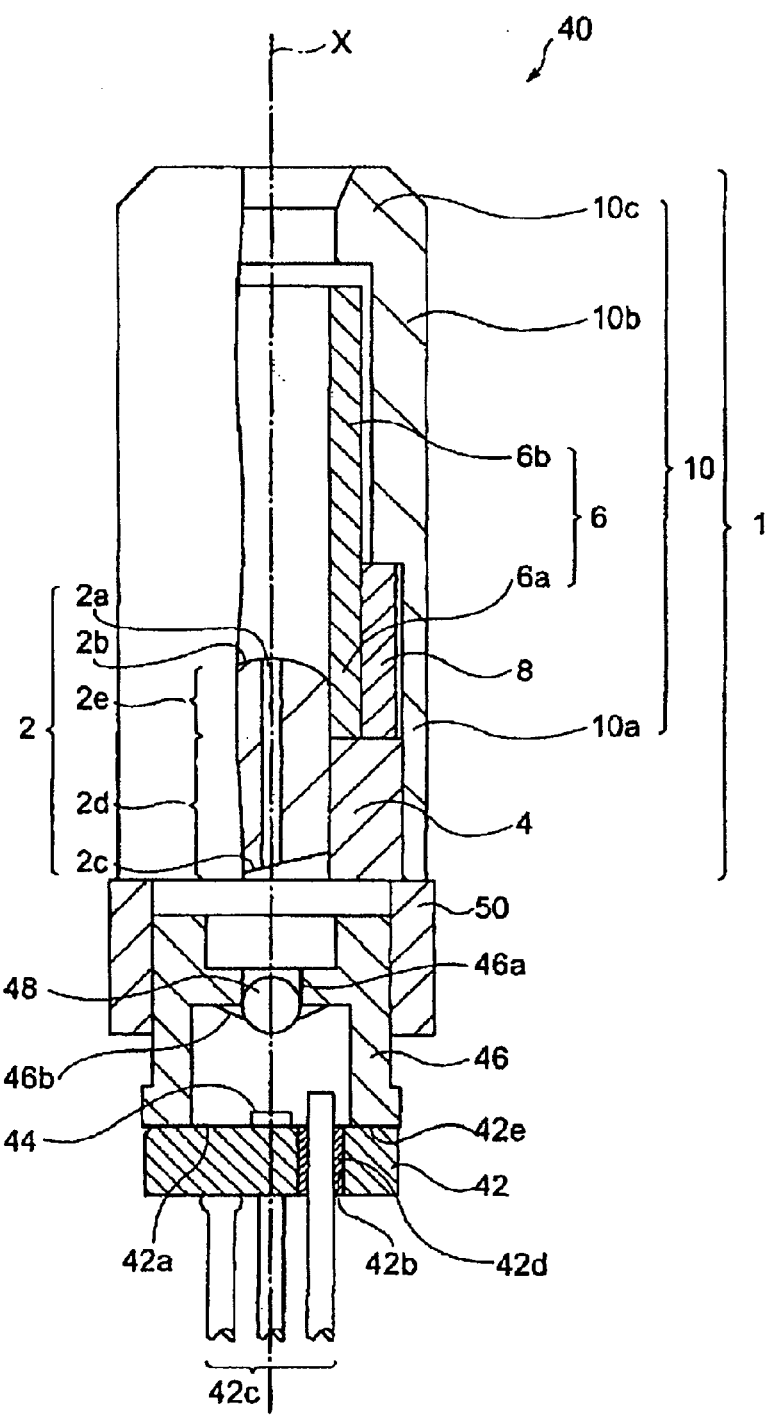
FIG. 6 shows a receiving optical sub-assembly using the sleeve assembly of the first embodiment of the present invention.

Next, a receiving optical sub-assembly (ROSA) 40 according to the present invention will be described. FIG. 6 is a cutaway side view showing the ROSA 40, which includes a stem 42, a light-receiving device 44, a cap 46, a lens 48, an alignment member 50 and the sleeve assembly 1.

The stem 42, made of stainless steel, mounts the light-receiving device 44 thereon, i.e. the stem 42 provides a surface 42a intersecting the axis X for mounting the light-receiving device 44 thereon. The stem 42 further provides a plurality of holes 42b, where the lead 42c passes theretrough with filling the sealant 42d, such as a low-melting glass, into the gap between the lead 42c and the hole 42d. Thus, the lead 42d is electrically isolated from the stem 42. One electrode of the light-receiving device 44 is connected to the lead 42c. The stem 42 further includes a portion 42e for supporting the cap 46 around the mounting surface 42a.

The cap 46 is also a tubular member made of metal such as a stainless steel, and forms a cavity co-operating with the stem 42, where the light-receiving device 44 is enclosed therein. The cap 46 provides a portion 46a for holding the lens, which extends along the direction perpendicular to the axis X and has an opening in the center thereof. The lens 48 is secured to the lens-holding portion 46a with a sealant 46b such as a low-melting glass. The lens 48 converges the light emitted from the tip of the coupling fiber 2a held in the center of the stub 2 into the light-receiving device 44.

On the outer surface of the cap 46 is provided an alignment member 50, one end of which secures the sleeve assembly 1. By providing the alignment member 50 between the sleeve assembly 1 and the cap 46, not only a length between the sleeve assembly and the optical device but also the position in a plane perpendicular to the axis X may be adjusted, thus the optical alignment can be carried out.

Figure 7:
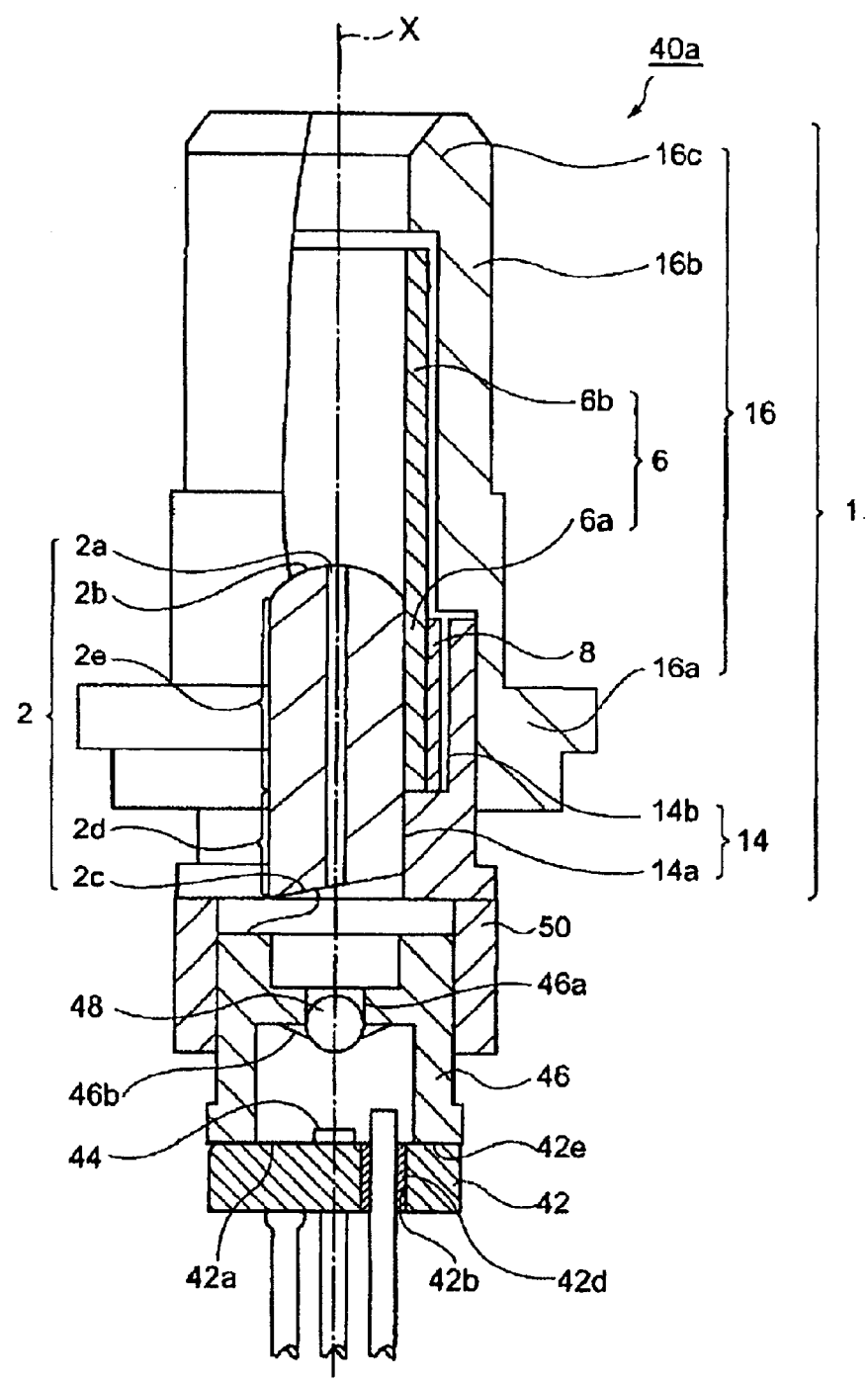
FIG. 7 shows another receiving optical sub-assembly using the sleeve is assembly of the second embodiment of the present invention.
Figure 8:
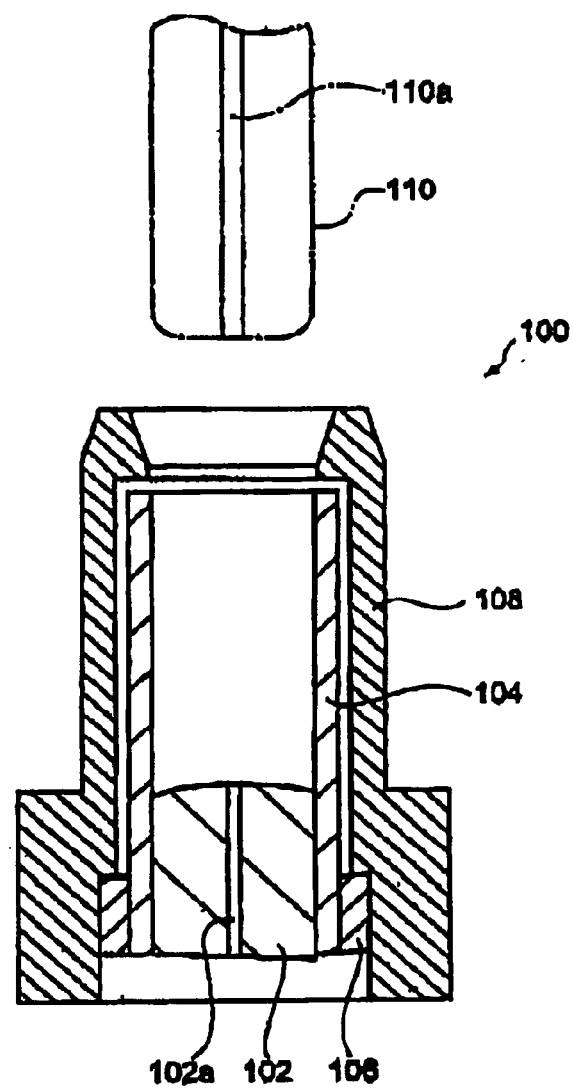
FIG. 8 is a cutaway perspective view showing a conventional sleeve assembly.

Since the present optical sub-assembly 40, the first mating portion 6a of the sleeve 6 fits the ring member 8, the sleeve is hard to wiggle due to an external force applied through the ferrule. Accordingly, the optical coupling between the light-receiving device 44 with an optical fiber secured in the ferrule can be maintained. The sleeve assembly 1 may be replaced with the modified sleeve assembly 1a shown in FIG. 3. FIG. 7 is a cutaway side view showing such optical subassembly 40a having the modified sleeve assembly 1a.

While the invention has been particularly shown and described with respect to illustrative and preferable embodiments thereof, it will be understood by those skilled in the art that the foregoing and other changes in arrangement and details may be made therein without departing from the spirit and scope of the invention which should be limited only by the scope of the following claims.

What is claimed is:

1. A sleeve assembly comprising:
   a stub having a first portion and a second portion;
   a sleeve having a first mating portion and a second mating portion, wherein said first mating portion mates with said second portion of said stub and said second mating portion receives a ferrule;
   a ring member for holding said first mating portion of said sleeve therein;
   a bush for holding said first portion of said stub and not holding said sleeve; and
   a sleeve cover for covering said bush, said ring member, and said sleeve therein, wherein said ring member is independent of said bush.

2. The sleeve assembly according to claim 1, wherein said bush is press-fitted between said stub and said sleeve cover.

3. The sleeve assembly according to claim 1, wherein said sleeve cover comprises a first bore having a first diameter and a second bore having a second diameter smaller than said first diameter, said first bore receiving said bush and said ring member, said second bore receiving said sleeve.

4. The sleeve assembly according to claim 3, wherein said bush comprises a first bore having a first diameter and a second bore having a second diameter greater than said first diameter, said first bore receiving said stub and said second bore receiving said first portion of said sleeve through said ring member.

5. The sleeve assembly according to claim 1, wherein said stub secures a coupling fiber in a center thereof.

6. The sleeve assembly according to claim 1, wherein said stub is made of ceramic.

7. The sleeve assembly according to claim 1, wherein said sleeve is a split sleeve having a slit along an axis thereof.

8. The sleeve assembly according to claim 6, wherein said sleeve is made of ceramic.

9. The sleeve assembly according to claim 6, wherein said sleeve is made of metal.

10. The sleeve assembly according to claim 1, wherein said bush and said ring member are made of metal.

11. An optical sub-assembly, comprising:
   an optical device, including,
      a semiconductor optical device,
      a stem for mounting said semiconductor optical device thereon,
      a plurality of leads provided in said stem and electrically isolated from said stem,
      a cap for forming a cavity co-operating with said stem, said semiconductor optical device being enclosed in said cavity;
   a sleeve assembly; including
      a stub having a first portion and a second portion,
      a sleeve having a first mating portion and a second mating portion, wherein said first mating portion mates with said second portion of said stub and said second mating portion receiving a ferrule,
      a bush for holding said first portion of said stub,
      a ring member for holding said first mating portion of said stub and not holding said sleeve, and
      a sleeve cover for covering said bush, said ring member, and said sleeve therein; and
   an alignment member provided between said optical device and said sleeve assembly for optically aligning said sleeve assembly with said optical device, wherein said ring member is independent of said bush.

12. The optical sub-assembly according to claim 11, wherein said semiconductor optical device is a semiconductor laser diode, and said stem further includes a block and a heat sink, said semiconductor laser diode being mounted on said block through said heat sink.

13. The optical sub-assembly according to claim 11, wherein said semiconductor optical device is a photodiode.

14. The optical sub-assembly according to claim 11, wherein said bush is press-fitted between said stub and said sleeve cover.

15. The optical sub-assembly according to claim 11, wherein said sleeve cover comprises a first bore having a first diameter and a second bore having a second diameter smaller than said first diameter, said first bore receiving said bush, said second bore receiving said sleeve and said ring member.

16. The optical sub-assembly according to claim 15, wherein said bush comprises a first bore having a first diameter and a second bore having a second diameter greater than said first diameter, said first bore receiving said stub and said second bore receiving said first portion of said sleeve through said ring member.

17. The optical sub-assembly according to claim 11, wherein said stub is made of ceramic.

18. The optical sub-assembly according to claim 11, wherein said sleeve is a split sleeve having a slit along an axis thereof.

19. The optical sub-assembly according to claim 17, wherein said sleeve is made of ceramic.

20. The optical sub-assembly according to claim 17, wherein said sleeve is made of metal.

* * * * *